(12) United States Patent
Chang et al.

(10) Patent No.: US 11,414,553 B2
(45) Date of Patent: *Aug. 16, 2022

(54) FOULING-PROOF STRUCTURE

(71) Applicant: JANTEC CORP., New Taipei (TW)

(72) Inventors: Ching-Hsiang Chang, New Taipei (TW); Kuo-Hsing Yeh, New Taipei (TW); Chun-Chieh Wang, New Taipei (TW)

(73) Assignee: JANTEC CORP., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,873

(22) Filed: Mar. 6, 2020

(65) Prior Publication Data

US 2021/0040332 A1 Feb. 11, 2021

(30) Foreign Application Priority Data

Aug. 6, 2019 (TW) .................................. 108127961
Dec. 12, 2019 (TW) .................................. 108145528

(51) Int. Cl.
*C09D 5/16* (2006.01)
*C08L 75/06* (2006.01)
(Continued)

(52) U.S. Cl.
CPC ............ *C09D 5/1693* (2013.01); *C08L 27/18* (2013.01); *C08L 75/06* (2013.01); *C08L 75/08* (2013.01);
(Continued)

(58) Field of Classification Search
CPC .. C09D 5/1693; C09D 5/1662; C09D 175/06; C09D 175/08; C08L 75/06; C08L 75/08;
(Continued)

(56) References Cited

U.S. PATENT DOCUMENTS

2010/0200207 A1* 8/2010 Fukuda ..................... C08F 2/38
165/185
2011/0070376 A1* 3/2011 Wales ..................... B08B 17/02
427/414

(Continued)

FOREIGN PATENT DOCUMENTS

CN 109233535 A * 1/2019
CN 109354994 A * 2/2019

OTHER PUBLICATIONS

Machine translation of CN 109 233 535 A (Year: 2019).*
Machine translation of CN 109 354 994 A (Year: 2019).*

*Primary Examiner* — Callie E Shosho
*Assistant Examiner* — Steven A Rice

(57) ABSTRACT

A fouling-proof structure is applicable to synthetic leather or fabric and it includes an alcohol-resistant layer; and a water-based fouling-proof layer disposed on the alcohol-resistant layer, wherein the alcohol-resistant layer is formed by curing an alcohol-resistant combination, and the alcohol-resistant combination comprises polyurethane resin, wherein the water-based fouling-proof layer is formed by curing a water-based fouling-proof combination, and the water-based fouling-proof combination comprises polyurethane resin, water, polymerized siloxanes, water-based PTFE and silicone oil.

3 Claims, 1 Drawing Sheet

(51) Int. Cl.

| | |
|---|---|
| *C08L 75/08* | (2006.01) |
| *C09D 175/06* | (2006.01) |
| *C09D 175/08* | (2006.01) |
| *D06N 3/00* | (2006.01) |
| *D06N 3/18* | (2006.01) |
| *C09D 7/42* | (2018.01) |
| *C08L 27/18* | (2006.01) |
| *C08L 83/04* | (2006.01) |
| *C08K 5/5419* | (2006.01) |
| *C09D 7/47* | (2018.01) |
| *C08K 5/23* | (2006.01) |

(52) U.S. Cl.
CPC ............ *C08L 83/04* (2013.01); *C09D 5/1662* (2013.01); *C09D 5/1687* (2013.01); *C09D 7/42* (2018.01); *C09D 7/47* (2018.01); *C09D 175/06* (2013.01); *C09D 175/08* (2013.01); *D06N 3/0059* (2013.01); *D06N 3/183* (2013.01); *C08K 5/23* (2013.01); *C08K 5/5419* (2013.01); *C08L 2205/025* (2013.01); *C08L 2205/03* (2013.01); *D06N 2201/0281* (2013.01); *D06N 2203/042* (2013.01); *D06N 2203/066* (2013.01); *D06N 2203/068* (2013.01)

(58) Field of Classification Search
CPC ........... C08L 2205/025; C08L 2205/03; D06N 3/0059; D06N 3/183; D06N 2201/0281; D06N 2203/042; D06N 2203/066; D06N 2203/068
USPC ...................................................... 428/423.1
See application file for complete search history.

(56) References Cited

U.S. PATENT DOCUMENTS

| | | | |
|---|---|---|---|
| 2018/0079187 A1* | 3/2018 | Satoh | ...................... B32B 27/08 |
| 2019/0039361 A1* | 2/2019 | Nakao | ................... C08G 18/10 |
| 2020/0024462 A1* | 1/2020 | Moore | ................... C08G 77/14 |
| 2020/0048477 A1* | 2/2020 | Isaksson | ................ B05D 3/108 |
| 2021/0040349 A1* | 2/2021 | Chang | ..................... C08L 83/04 |

\* cited by examiner

FOULING-PROOF STRUCTURE

CROSS-REFERENCE TO RELATED APPLICATION

This non-provisional application claims priority under 35 U.S.C. § 119(a) on Patent Application No(s). 108127961 filed in Taiwan, R.O.C. on Aug. 6, 2019 and Patent Application No(s). 108145528 filed in Taiwan, R.O.C. on Dec. 12, 2019, the entire contents of which are hereby incorporated by reference.

BACKGROUND OF THE INVENTION

1. Field of the Invention

The present disclosure relates to fouling-proof structures, and in particular to a fouling-proof structure on a synthetic leather material surface.

2. Description of the Related Art

Use of synthetic leather is wide and increasing steadily year by year. However, the use of synthetic leather in garments, furniture, wall materials and public space is confronted with problems. For example, the surface of synthetic leather is susceptible to dirt or graffiti, which is unremovable and, in consequence, the resultant unattractive appearance of the synthetic leather leads to shortened service life and thus poses an environmental burden. Therefore, it is important to provide a fouling-proof structure effective in preventing dirt, cleaning, and preventing detergent-induced damage. The fouling-proof structure will extend the service life of related products, lower their replacement rates, lessen their impacts on the environment, and thus convert the products into green.

BRIEF SUMMARY OF THE INVENTION

In view of the aforesaid drawbacks of the prior art, an objective of the present disclosure is to provide a fouling-proof structure.

To achieve at least the above objective, the present disclosure provides a fouling-proof structure, comprising: an alcohol-resistant layer; and a water-based fouling-proof layer disposed on the alcohol-resistant layer, wherein the alcohol-resistant layer is formed by curing an alcohol-resistant combination, and the alcohol-resistant combination comprises polyurethane resin, and wherein the water-based fouling-proof layer is formed by curing a water-based fouling-proof combination, and the water-based fouling-proof combination comprises polyurethane resin, water, polymerized siloxanes, water-based PTFE and silicone oil.

Regarding the fouling-proof structure, the alcohol-resistant combination comprises: 30-50 weight percent of polyether and polyester aliphatic water-based polyurethane resin; and further comprises 40-70 weight percent of water.

Regarding the fouling-proof structure, the alcohol-resistant combination further comprises: 0.01-3 weight percent of wetting agent; 0.01-2 weight percent of aziridine crosslinker; 0.01-1 weight percent of antifoaming agent; and 0.5-2.5 weight percent of polycarbodiimide crosslinker.

Regarding the fouling-proof structure, the alcohol-resistant combination comprises: 70-90 weight percent of hydrolysis-resistant, yellowing-resistant polyether polyurethane resin; and further comprises: 5-15 weight percent of melamine type two-component crosslinker; and 4-15 weight percent of two-component chemical promoter.

Regarding the fouling-proof structure, the alcohol-resistant combination further comprises: 0.01-2 weight percent of matting agent.

Regarding the fouling-proof structure, the water-based fouling-proof combination comprises: 5-40 weight percent of polyether and polyester aliphatic, hydrolysis-resistant, water-based polyurethane resin; 40-70 weight percent of water; 5-30 weight percent of polymerized siloxanes; 1-10 weight percent of water-based PTFE; and 1-10 weight percent of silicone oil.

Regarding the fouling-proof structure, the water-based fouling-proof combination further comprises: 0.1-3 weight percent of isocyanate crosslinker; 0.1-3 weight percent of tackifier; 0.1-3 weight percent of wetting agent; 0.01-3 weight percent of antifoaming agent; 5-15 weight percent of leather slipping agent; and 0.01-1 weight percent of matting agent.

The fouling-proof structure is disposed on a substrate. The alcohol-resistant layer is disposed between the water-based fouling-proof layer and the substrate. Besides, the substrate can be made of fabric, polyurethane (PU) or polyvinyl chloride (PVC). In a variant embodiment, the substrate is made of fabric, PU, water-based PU, PVC, semi PU/PVC, thermoplastic polyurethane (TPU), thermoplastic olefin (TPO), thermoplastic vulcanizate (TPV), thermoplastic styrene (TPS), thermoplastic polyether ester elastomer (TPEE), thermoplastic polyamide (TPA), or a combination thereof.

The fouling-proof structure of the present disclosure is applicable to the surface of synthetic leather. None of the hotel ballpoint pen, ballpoint pen or gel pen is able to cause a stain to the surface of the synthetic leather which has the fouling-proof structure of the present disclosure; even if it is, the stain can be easily removed to a great extent with dry cloth, and then the remainder of the stain can also be removed by commercial detergents or alcohol solution, so as to restore the appearance of the surface of the synthetic leather material.

According to the prior art, the conventional fouling-proof structure formed on the synthetic leather surface does not have a basal layer made of an alcohol-resistant material, and thus the structure is likely to be damaged or has its fouling-proof performance quickly decayed when it has wiped with solvent. It is because the bonding between the fouling-proof material and the synthetic leather to be protected is so worse that the layer readily becomes a disposable fouling-proof layer and thus lacks commercial value and practicability.

By contrast, the fouling-proof structure of the present disclosure has a basal layer made of an alcohol-resistant material beneath the water-based fouling-proof material. In a preferred embodiment, the water-based fouling-proof material undergoes a spraying-coating process before the alcohol-resistant layer is curing (reacts with the substrate surface completely), and the two layers are simultaneously cured together (react completely) at high temperature. The alcohol-resistant layer is graffiti-proof. The purpose of the aforesaid processing and reaction process is to avoid a condition: after the alcohol-resistant layer has cured at high temperature completely, the water-based fouling-proof material can no longer be bonded to the alcohol-resistant layer perfectly, thereby causing the fouling-proof layer to detach.

The fouling-proof structure of the present disclosure comprises a water-based fouling-proof layer and an alcohol-resistant layer, and it can be the protective layers on the substrates made of various materials.

In a variant embodiment, it is only when the synthetic leather material which is covered with the fouling-proof structure comprising a water-based fouling-proof layer and an alcohol-resistant layer is wiped repeatedly at least 30 times with alcohol solution or commercial detergents and then begins to decrease the performance of its fouling-proof structure.

BRIEF DESCRIPTION OF THE DRAWINGS

In order to clarify the description, the thickness and size of each layer shown in the drawings are enlarged, omitted or schematically depicted. The drawings are not drawn to scale.

DETAILED DESCRIPTION OF THE INVENTION

To well understand the purpose, characteristics, and effects of this present disclosure, embodiments together with the detailed descriptions and the attached tables of the present disclosure are provided.

Embodiment 1-1

Figure 1:
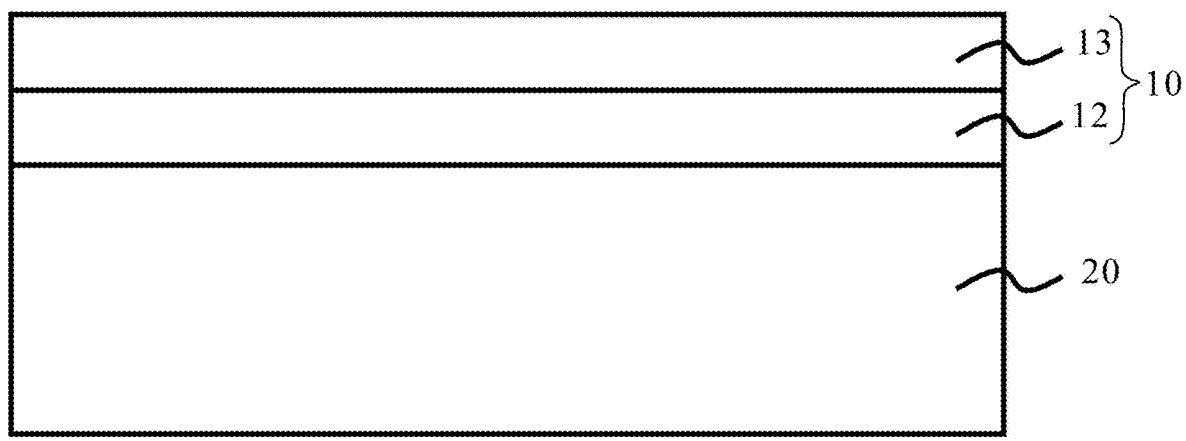
FIG. 1 is a scheme of a fouling-proof structure and a substrate according to embodiment 1 of the present disclosure.

Referring to FIG. 1, a fouling-proof structure 10 in embodiment 1 comprises an alcohol-resistant layer 12 and a water-based fouling-proof layer 13 disposed on the alcohol-resistant layer 12. In this embodiment, the fouling-proof structure 10 is disposed on a substrate 20. The alcohol-resistant layer 12 is disposed between the water-based fouling-proof layer 13 and the substrate 20.

In this embodiment, the substrate 20 is water-based PU synthetic leather, but the present disclosure is not limited thereto. In a variant embodiment, the substrate is fabric, polyurethane (PU) leather, water-based PU leather, polyvinyl chloride (PVC) leather, semi PU/PVC leather, thermoplastic polyurethane (TPU) leather, thermoplastic olefin (TPO), thermoplastic vulcanizate (TPV), thermoplastic styrene (TPS), thermoplastic polyether ester elastomer (TPEE), thermoplastic polyamide (TPA), or a combination thereof.

The process of producing the fouling-proof structure 10 in this embodiment is as follows:
 a) coating an alcohol-resistant combination on the substrate 20 and drying the alcohol-resistant combination at 90-120° C. for one to five minutes to form the alcohol-resistant layer 12;
 b) coating a water-based fouling-proof combination on the alcohol-resistant layer 12 and drying the water-based fouling-proof combination above 140° C. for one to five minutes to form the water-based fouling-proof layer 13.

The drying temperature and duration in step a) and step b) only serve exemplary purposes and thus must not be interpreted in such a manner to be restrictive of the scope of the present disclosure. Hence, persons skilled in the art can appropriately adjust the drying temperature and duration in step a) and step b) as needed without departing from the scope of the claims of the present disclosure. In a variant embodiment, the drying in step b) takes place at 140-145° C.

In this embodiment, the alcohol-resistant combination and water-based fouling-proof combination are coated by means of spraying-coating, but the present disclosure is not limited thereto; hence, persons skilled in the art can select an appropriate method of coating as needed. According to the present disclosure, the means of coating for use in the method of producing a fouling-proof structure includes but is not limited to: spraying-coating, soaking-coating, showering-coating, painting-coating, rotating-coating, vacuum-coating, rolling-coating and direct coating.

In this embodiment, the alcohol-resistant layer 12 is formed by curing an alcohol-resistant combination A. The constituents of the alcohol-resistant combination A are enumerated in Table 1 below.

TABLE 1

| | weight percent | | |
|---|---|---|---|
| constituent | alcohol-resistant combination A | alcohol-resistant combination B | alcohol-resistant combination C |
| aliphatic water-based PU resin (polyether & polyester type) (model number: F-363, purchased from Chain Chemical Co., Ltd.) | 30 | 42 | 50 |
| wetting agent (model number: OFX-5211, purchased from Guang zhou HT-Chemical Co., Ltd.) | 0.5 | 1.5 | 3 |
| aziridine crosslinker (model number: PZ-33, purchased from PolyAziridine LLC) | 1 | 1.5 | 2 |
| antifoaming agent (model number: A5757, purchased from Sigma-Aldrich) | 0 | 0.5 | 1 |
| polycarbodiimide crosslinker (model number: V-02-L2, purchased from An Fong Development Co., Ltd.) | 0.7 | 1.4 | 2.1 |
| water | 67.8 | 53.1 | 41.9 |

In this embodiment, the water-based fouling-proof layer 13 is formed by curing the water-based fouling-proof combination A. The constituents of the water-based fouling-proof combination A are enumerated in Table 2 below.

TABLE 2

| | weight percent | | |
|---|---|---|---|
| constituent | water-based fouling-proof combination A | water-based fouling-proof combination B | water-based fouling-proof combination C |
| aliphatic & hydrolysis-resistant water-based PU resin (polyether & polyester type) (model number: JW-25A-2, purchased from Jiuh Yi Chemical Industrial Co. Ltd.) | 6.6 | 19.4 | 28.9 |
| isocyanate crosslinker (model number: EC-385, purchased from SiwoChem) | 0.6 | 1.9 | 2.9 |
| water | 58.5 | 50.2 | 43.6 |
| polymerized siloxanes (model number: PA-8316, purchased from Guang zhou HT-Chemical Co., Ltd.) | 15.3 | 13.4 | 12 |
| water-based polytetrafluoroethylene (PTFE) (model number: Teflon™ PTFE, purchased from Dupont Chemours) | 2 | 1.1 | 1 |

TABLE 2-continued

|  | weight percent | | |
| --- | --- | --- | --- |
| constituent | water-based fouling-proof combination A | water-based fouling-proof combination B | water-based fouling-proof combination C |
| silicone oil (model number: 85409-IL, purchased from Sigma-Aldrich) | 2.0 | 1.7 | 1.4 |
| tackifier (model number: CA-909, purchased from Xuanning Chemical Technology) | 0.5 | 0.4 | 0.3 |
| wetting agent (model number: OFX-5211, purchased from Guang zhou HT-Chemical Co., Ltd.) | 0.3 | 0.2 | 0.2 |
| antifoaming agent (model number: A5757, purchased from Sigma-Aldrich | 0.1 | 0.1 | 0.1 |
| leather slipping agent (model number: AQUADERM ADDITIVE GF, purchased from Lanxess (Changzhou) Co., Ltd.) | 13.1 | 11.1 | 9.6 |
| matting powder (model number: ACEMATT ® TS-100, purchased from EVONIK) | 1 | 0.5 | 0 |

The product model numbers, suppliers, and weight percents of the constituents enumerated in Table 1 and Table 2 only serve exemplary purposes but must not be interpreted in such a manner to be restrictive of the scope of the present disclosure. Hence, persons skilled in the art can select appropriate product model numbers and suppliers of the constituents and adjust appropriate weight percents as needed without departing from the scope of the claims of the present disclosure. In this embodiment, for exemplary purposes, matting powder is used as the matting agent, but the present disclosure is not limited thereto, and thus it is feasible to use any other types (for example, liquid) of matting agent. In a variant embodiment, the alcohol-resistant combination does not include any wetting agent, aziridine crosslinker and antifoaming agent. In a variant embodiment, the water-based fouling-proof combination does not include any antifoaming agent and matting agent.

Figure 2:
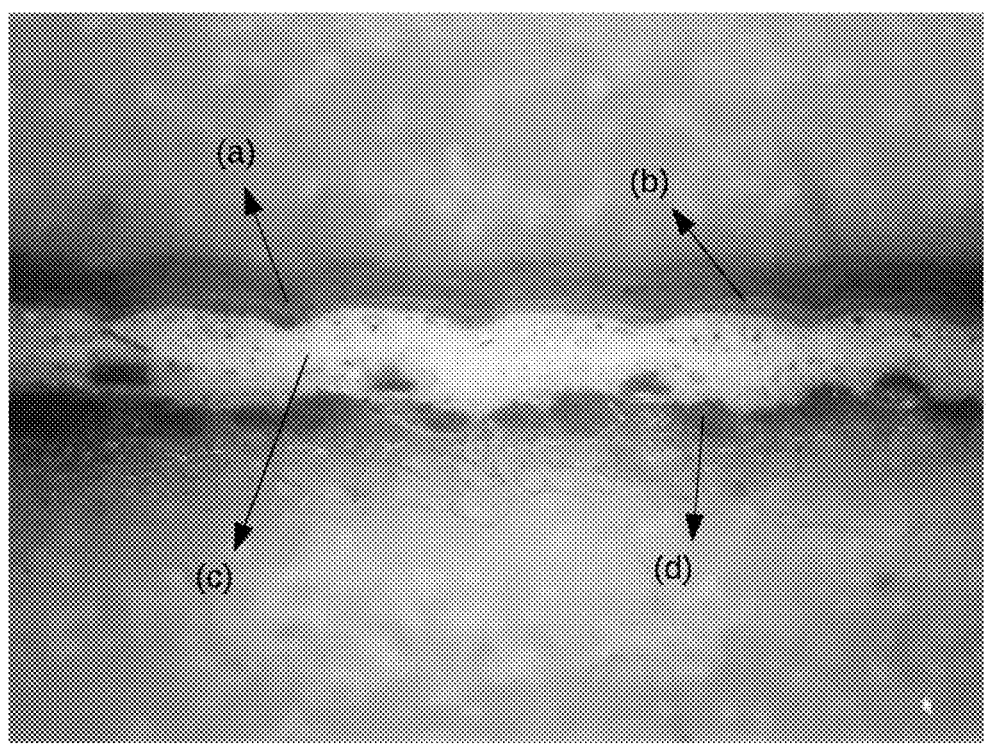
FIG. 2 is a picture of the fouling-proof structure and the substrate according to embodiment 1 of the present disclosure.

FIG. 2 is a picture taken of the fouling-proof structure 10 and the substrate 20 according to embodiment 1 of the present disclosure. The picture shows four layers arranged from top to bottom as follows: (a) a top layer is the fouling-proof structure 10 which comprises the alcohol-resistant layer 12 and the water-based fouling-proof layer 13; the substrate 20 includes: (b) a surface layer which comprises the surface of water-based PU; (c) a middle layer which comprises water-based PU foam; and (d) fabric.

Embodiment 1-2

When it comes to the fouling-proof structure and the process of producing the same, embodiment 1-2 differs from embodiment 1-1 as follows: in embodiment 1-2, the alcohol-resistant layer is formed by curing an alcohol-resistant combination B, and the constituents of the alcohol-resistant combination B are enumerated in Table 1; and the water-based fouling-proof layer is formed by curing the water-based fouling-proof combination B, and the constituents of the water-based fouling-proof combination B are enumerated in Table 2 above.

Embodiment 1-3

When it comes to the fouling-proof structure and the process of producing the same, embodiment 1-3 differs from embodiment 1-1 as follows: in embodiment 1-3, the alcohol-resistant layer is formed by curing an alcohol-resistant combination C; the constituents of the alcohol-resistant combination C are enumerated in Table 1 above; and the water-based fouling-proof layer is formed by curing the water-based fouling-proof combination C, and the constituents of the water-based fouling-proof combination C are enumerated in Table 2 above.

Embodiment 2-1

The fouling-proof structure in embodiment 2-1 comprises: an alcohol-resistant layer; and a water-based fouling-proof layer disposed on the alcohol-resistant layer. In this embodiment, the fouling-proof structure is disposed on a substrate, and the alcohol-resistant layer is disposed between the water-based fouling-proof layer and the substrate.

In this embodiment, the substrate is solvent-based PU synthetic leather, but the present disclosure is not limited thereto. In a variant embodiment, the substrate is fabric, polyurethane (PU) leather, water-based PU leather, polyvinyl chloride (PVC) leather, semi PU/PVC leather, thermoplastic polyurethane (TPU) leather, thermoplastic olefin (TPO), thermoplastic vulcanizate (TPV), thermoplastic styrene (TPS), thermoplastic polyether ester elastomer (TPEE), thermoplastic polyamide (TPA), or a combination thereof.

The process flow of producing the fouling-proof structure in this embodiment comprises the steps as follows:

a) coating an alcohol-resistant combination on a substrate and then drying the alcohol-resistant combination at 90-130° C. for one to five minutes to form an alcohol-resistant layer; and b) coating a water-based fouling-proof combination on the alcohol-resistant layer and then drying the water-based fouling-proof combination above 140° C. for one to five minutes to form a water-based fouling-proof layer.

The drying temperatures and durations in step a) and step b) only serve exemplary purposes but must not be interpreted in such a manner to be restrictive of the scope of the present disclosure. Persons skilled in the art can appropriately adjust the drying temperatures and durations in step a) and step b) as needed without departing from the scope of the claims of the present disclosure. In a variant embodiment, the drying in step b) takes place at 140-145° C.

In this embodiment, the alcohol-resistant combination and water-based fouling-proof combination are coated by spraying-coating, but the present disclosure is not limited thereto, and thus persons skilled in the art may choose an appropriate way of coating as needed. The way of coating for use in the method of producing a fouling-proof structure according to the present disclosure includes, but is not limited to, spraying-coating, soaking-coating, showering-coating, painting-coating, rotating-coating, vacuum-coating, rolling-coating and direct coating.

In this embodiment, the alcohol-resistant layer is formed by curing an alcohol-resistant combination D, and the constituents of the alcohol-resistant combination D are enumerated in Table 3 below.

TABLE 3

| constituent | alcohol-resistant combination D | alcohol-resistant combination E | alcohol-resistant combination F |
|---|---|---|---|
| hydrolysis-resistant & yellowing-resistant PU resin (polyether type) (model number: SC-8200G, purchased from Guangzhou Songjeong Chemical Co., Ltd.) | 76 | 82 | 88 |
| two-component crosslinker (melamine type) (model number: SH-82, purchased from Guangzhou Songjeong Chemical Co., Ltd.) | 11 | 8.2 | 5.3 |
| matting powder (model number: ACEMATT ® TS-100, purchased from EVONIK) | 1.5 | 1.6 | 1.8 |
| two-component chemical promoter (model number: SE-82, purchased from Guangzhou Songjeong Chemical Co., Ltd.) | 11.5 | 8.2 | 4.9 |

In this embodiment, the water-based fouling-proof layer is formed by curing the water-based fouling-proof combination D, and the constituents of the water-based fouling-proof combination D are enumerated in Table 4 below.

TABLE 4

| constituent | water-based fouling-proof combination D | water-based fouling-proof combination E | water-based fouling-proof combination F |
|---|---|---|---|
| aliphatic & hydrolysis-resistant, water-based PU resin (polyether & polyester type) (model number: JW-25A-2, purchased from Jiuh Yi Chemical Industrial Co. Ltd.) | 6.6 | 19.4 | 28.9 |
| isocyanate crosslinker (model number: EC-385, purchased from SiwoChem) | 0.6 | 1.9 | 2.9 |
| water | 58.5 | 50.2 | 43.6 |
| polymerized siloxanes (model number: PA-8316, purchased from Guang zhou HT-Chemical Co., Ltd.) | 15.3 | 13.4 | 12 |
| water-based polytetrafluoroethylene (PTFE) (model number: Teflon ™ PTFE, purchased from Dupont Chemours) | 2 | 1.1 | 1 |
| silicone oil (model number: 85409-IL, purchased from Sigma-Aldrich) | 2.0 | 1.7 | 1.4 |
| tackifier (model number: CA-909, purchased from Xuanning Chemical Technology) | 0.5 | 0.4 | 0.3 |
| wetting agent (model number: OFX-5211, purchased from Guang zhou HT-Chemical Co., Ltd.) | 0.3 | 0.2 | 0.2 |
| antifoaming agent (model number: A5757, purchased from Sigma-Aldrich) | 0.1 | 0.1 | 0.1 |
| leather slipping agent (model number: AQUADERM ADDITIVE GF, purchased from Lanxess (Changzhou) Co., Ltd.) | 13.1 | 11.1 | 9.6 |
| matting powder (model number: ACEMATT ® TS-100, purchased from EVONIK) | 1 | 0.5 | 0 |

The product model numbers, suppliers, and weight percents of the constituents enumerated in Table 3 and Table 4 only serve exemplary purposes but must not be interpreted in such a manner to be restrictive of the scope of the present disclosure. Persons skilled in the art can select appropriate product model numbers and suppliers of the constituents and adjust appropriate weight percents as needed without departing from the scope of the claims of the present disclosure. In this embodiment, matting powder is used as the matting agent for exemplary purposes, but the present disclosure is not limited thereto, and thus it is feasible to use any other types (for example, liquid) of matting agent. In a variant embodiment, the alcohol-resistant combination does not include any matting agent. In a variant embodiment, the water-based fouling-proof combination does not include any antifoaming agent and matting agent.

Embodiment 2-2

When it comes to the fouling-proof structure and the process of producing the same, embodiment 2-2 differs from embodiment 2-1 as follows: in embodiment 2-2, the alcohol-resistant layer is formed by curing an alcohol-resistant combination E, and the constituents of the alcohol-resistant combination E are enumerated in Table 3 above; and the water-based fouling-proof layer is formed by curing the water-based fouling-proof combination E, and the constituents of the water-based fouling-proof combination E are enumerated in Table 4 above.

Embodiment 2-3

When it comes to the fouling-proof structure and the process of producing the same, embodiment 2-3 differs from embodiment 2-1 as follows: in embodiment 2-3, the alcohol-resistant layer is formed by curing an alcohol-resistant combination F, and the constituents of the alcohol-resistant combination F are enumerated in Table 3 above; and the water-based fouling-proof layer is formed by curing the water-based fouling-proof combination F, and the constituents of the water-based fouling-proof combination F are enumerated in Table 4 above.

Test

A test is performed on the fouling-proof structure of embodiments 1-1 through 1-3 and 2-1 through 2-3. First, the ability of the fouling-proof structure of embodiments 1-1 through 1-3 and 2-1 through 2-3 is testified by specific staining agents. Next, after a specific period of time has passed, the contaminated fouling-proof structure is wiped. After that, remnants of stains are assessed in terms of their extent, and the result of the assessment is shown in Table 5 below.

TABLE 5

| staining agents, (class) | stain dwell time | | | | | |
|---|---|---|---|---|---|---|
| | within 3 minutes | | 3 hours later | | 24 hours later | |
| | preclean-wipe with dry cloth | 95% ethanol* | preclean-wipe with dry cloth | 95% ethanol* | preclean-wipe with dry cloth | 95% ethanol* |
| Embodiment 1-1 | | | | | | |
| denim dye (color migration) | 5 | 5 | 5 | 5 | 5 | 5 |
| hotel ballpoint pen | 5 | 5 | 5 | 5 | 5 | 5 |
| marker | 5 | 5 | 5 | 5 | 4 | 4.5 |
| black tea | 5 | 5 | 5 | 5 | 5 | 5 |
| coffee | 5 | 5 | 5 | 5 | 5 | 5 |
| ketchup | 5 | 5 | 5 | 5 | 5 | 5 |
| mustard | 5 | 5 | 5 | 5 | 4 | 4.5 |
| Coca-Cola | 5 | 5 | 5 | 5 | 5 | 5 |
| soy sauce | 5 | 5 | 5 | 5 | 5 | 5 |
| Embodiment 1-2 | | | | | | |
| denim dye (color migration) | 5 | 5 | 5 | 5 | 5 | 5 |
| hotel ballpoint pen | 5 | 5 | 5 | 5 | 5 | 5 |
| marker | 5 | 5 | 5 | 5 | 4.5 | 5 |
| black tea | 5 | 5 | 5 | 5 | 5 | 5 |
| coffee | 5 | 5 | 5 | 5 | 5 | 5 |
| ketchup | 5 | 5 | 5 | 5 | 5 | 5 |
| mustard | 5 | 5 | 5 | 5 | 4.5 | 5 |
| Coca-Cola | 5 | 5 | 5 | 5 | 5 | 5 |
| soy sauce | 5 | 5 | 5 | 5 | 5 | 5 |
| Embodiment 1-3 | | | | | | |
| denim dye (color migration) | 5 | 5 | 5 | 5 | 5 | 5 |
| hotel ballpoint pen | 5 | 5 | 5 | 5 | 5 | 5 |
| marker | 5 | 5 | 4.5 | 5 | 3.5 | 4 |
| black tea | 5 | 5 | 5 | 5 | 5 | 5 |
| coffee | 5 | 5 | 5 | 5 | 5 | 5 |
| ketchup | 5 | 5 | 5 | 5 | 5 | 5 |
| mustard | 5 | 5 | 4.5 | 5 | 3.5 | 4 |
| Coca-Cola | 5 | 5 | 5 | 5 | 5 | 5 |
| soy sauce | 5 | 5 | 5 | 5 | 5 | 5 |
| Embodiment 2-1 | | | | | | |
| denim dye (color migration) | 5 | 5 | 5 | 5 | 5 | 5 |
| hotel ballpoint pen | 5 | 5 | 5 | 5 | 5 | 5 |
| marker | 5 | 5 | 5 | 5 | 4 | 4.5 |
| black tea | 5 | 5 | 5 | 5 | 5 | 5 |
| coffee | 5 | 5 | 5 | 5 | 5 | 5 |
| ketchup | 5 | 5 | 5 | 5 | 5 | 5 |
| mustard | 5 | 5 | 5 | 5 | 4 | 4.5 |
| Coca-Cola | 5 | 5 | 5 | 5 | 5 | 5 |
| soy sauce | 5 | 5 | 5 | 5 | 5 | 5 |
| Embodiment 2-2 | | | | | | |
| denim dye (color migration) | 5 | 5 | 5 | 5 | 5 | 5 |
| hotel ballpoint pen | 5 | 5 | 5 | 5 | 5 | 5 |
| marker | 5 | 5 | 5 | 5 | 4.5 | 5 |
| black tea | 5 | 5 | 5 | 5 | 5 | 5 |
| coffee | 5 | 5 | 5 | 5 | 5 | 5 |
| ketchup | 5 | 5 | 5 | 5 | 5 | 5 |
| mustard | 5 | 5 | 5 | 5 | 4.5 | 5 |
| Coca-Cola | 5 | 5 | 5 | 5 | 5 | 5 |
| soy sauce | 5 | 5 | 5 | 5 | 5 | 5 |
| Embodiment 2-3 | | | | | | |
| denim dye (color migration) | 5 | 5 | 5 | 5 | 5 | 5 |
| hotel ballpoint pen | 5 | 5 | 5 | 5 | 5 | 5 |
| marker | 5 | 5 | 4.5 | 5 | 3.5 | 4 |
| black tea | 5 | 5 | 5 | 5 | 5 | 5 |
| coffee | 5 | 5 | 5 | 5 | 5 | 5 |
| ketchup | 5 | 5 | 5 | 5 | 5 | 5 |
| mustard | 5 | 5 | 4.5 | 5 | 3.5 | 4 |

TABLE 5-continued

| staining agents, (class) | stain dwell time | | | | | |
|---|---|---|---|---|---|---|
| | within 3 minutes | | 3 hours later | | 24 hours later | |
| | preclean-wipe with dry cloth | 95% ethanol* | preclean-wipe with dry cloth | 95% ethanol* | preclean-wipe with dry cloth | 95% ethanol* |
| Coca-Cola | 5 | 5 | 5 | 5 | 5 | 5 |
| soy sauce | 5 | 5 | 5 | 5 | 5 | 5 |

*wipe with dry cloth and then with 95% ethanol

Rating system:
Class 5 No evidence of stain present
Class 4 Slight evidence of stain present
Class 3 Noticeable evidence of stain present
Class 2 Considerable evidence of stain present
Class 1 Excessive evidence of stain present In Table 5, the cardinal number of the class assessment is 0.5. For example, 4.5 indicates that the fouling-proof class stands between class 4 and class 5. After being wiped with 95% ethanol, the fouling-proof structure contaminated by the staining agents enumerated in Table 5 has either no evidence or slight evidence of stain present. Hence, the fouling-proof structure of the present disclosure is capable of performing stain resistibility.

The main differences in synthetic leather processing between the fouling-proof structure of the present disclosure and a conventional fouling-proof material disclosed in the prior art are as follows:
1. Most of the commercial fouling-proof materials suitable for synthetic leather processing are solvent-based two-component resin. Their constituents include organic solvents, and thus they are confronted by the volatilization of volatile organic compounds (VOC).
2. Commercial fouling-proof materials suitable for use with leather are high-modulus resins. By contrast, the water-based PU used in the fouling-proof structure of the present disclosure is low-modulus resin. The issue of the ability of flex, which occurs in soft leather processing, is typical in the commercial fouling-proof materials but not in the fouling-proof structure of the present disclosure.
3. The ballpoint pen is hard to write on the synthetic leather coated with the fouling-proof material of the present disclosure. Even if it can do so, the stain can be wiped off easily. By contrast, the ballpoint pen can write on the synthetic leather coated with commercial fouling-proof materials easily, and the stain should wipe with detergent in three hours (better not more than 24 hours). Otherwise, the stain cannot be removed anymore.
4. There exists the issue of denim dye migration in commercial water-based fouling-proof material.
5. Commercial fouling-proof materials are not always suitable for all kinds of synthetic leather finishing.
6. The fouling-proof structure of the present disclosure comprises a water-based fouling-proof layer and an alcohol-resistant layer which are coupled together to form a stronger protective layer. Hence, until the fouling-proof structure of the present disclosure is wiped repeatedly with alcohol solution at least 30 times, its fouling-proof structure starts to decay.

The fouling-proof structure of the present disclosure has advantages as follows:
1. The main residues, water-based PU resin in the process of the fouling-proof structures can be reused.
2. The fouling-proof structure of the present disclosure is odorless, non-toxic, free of VOC, environment-friendly, and thus conducive to environmental protection.
3. The fouling-proof structure of the present disclosure is still high yellowing-resistant and free of burnt smell after high-temperature embossing process.

While the present disclosure has been described by means of specific embodiments, numerous modifications and variations could be made thereto by those skilled in the art without departing from the scope and spirit of the present disclosure set forth in the claims.

What is claimed is:

1. A fouling-proof structure, comprising:
an alcohol-resistant layer; and
a water-based fouling-proof layer disposed on the alcohol-resistant layer,
wherein the alcohol-resistant layer is formed by curing an alcohol-resistant combination by drying the alcohol-resistant combination at 90-120° C. for one to five minutes, and
wherein the water-based fouling-proof layer is formed by curing a water-based fouling-proof combination by drying the water-based fouling-proof combination above 140° C. for one to five minutes,
wherein the alcohol-resistant combination comprises:
30-50 weight percent of polyether and polyester aliphatic water-based polyurethane resin;
0.5-3 weight percent of wetting agent;
1-2 weight percent of aziridine crosslinker;
0.7-2.1 weight percent of polycarbodiimide crosslinker; and
41.9-67.8 weight percent of water;
wherein the water-based fouling-proof combination comprises:
6.6-28.9 weight percent of polyether and polyester aliphatic and hydrolysis-resistant water-based PU resin;
43.6-58.5 weight percent of water;
12-15.3 weight percent of polymerized siloxanes;
1-2 weight percent of water-based polytetrafluoroethylene; and
1.4-2.0 weight percent of silicone oil.

2. The fouling-proof structure of claim 1, wherein the water-based fouling-proof combination further comprises:
0.1-3 weight percent of isocyanate crosslinker;
0.1-3 weight percent of tackifier;
0.1-3 weight percent of wetting agent;
0.01-3 weight percent of antifoaming agent;
5-15 weight percent of leather slipping agent; and
0.01-1 weight percent of matting agent.

3. The fouling-proof structure of claim 1, wherein the fouling-proof structure is disposed on a substrate, and the alcohol-resistant layer is disposed between the water-based fouling-proof layer and the substrate, the substrate being made of fabric, polyurethane, polyvinyl chloride, thermoplastic polyurethane, thermoplastic olefin, thermoplastic vulcanizate, thermoplastic styrene, thermoplastic polyether ester elastomer or thermoplastic polyamide.

* * * * *